United States Patent [19]

Miyaoka et al.

[11] 3,954,133

[45] May 4, 1976

[54] SPHEROIDAL GRAPHITE CAST IRON PIPE OF FERRITIC STRUCTURE AND METHOD OF PRODUCING THE SAME

[75] Inventors: Tadashi Miyaoka, Nishinomiya; Hiromu Tanimura, Fukuoka; Yoshio Tanaka, Takarazuka; Susumu Togawa, Amagasaki, all of Japan

[73] Assignee: Kubota Ltd., Osaka, Japan

[22] Filed: Feb. 20, 1975

[21] Appl. No.: 551,310

[30] Foreign Application Priority Data
Feb. 23, 1974 Japan.............................. 49-21668

[52] U.S. Cl...................................... 164/76; 148/3; 148/35; 148/138
[51] Int. Cl.²........................................... B22D 7/00
[58] Field of Search...................... 164/122, 123, 76; 148/138, 139, 3, 35; 75/123 CB

[56] References Cited
UNITED STATES PATENTS

| | | | |
|---|---|---|---|
| 1,971,385 | 8/1934 | Russell et al............................ | 148/35 |
| 3,549,431 | 12/1970 | Castelet................................ | 148/35 |

FOREIGN PATENTS OR APPLICATIONS

| | | | |
|---|---|---|---|
| 470,101 | 12/1950 | Canada................................ | 148/138 |

*Primary Examiner*—Arthur J. Steiner
*Attorney, Agent, or Firm*—Farley, Forster and Farley

[57] ABSTRACT

A product and method of producing a spheroidal graphite cast iron pipe of ferritic structure by casting in a non-chilled condition and by providing a controlled low rate of dissipation of the self-heat of the pipe within a heat dissipation rate controlling furnace or a sealed or insulated centrifugal casting mold.

6 Claims, 13 Drawing Figures

SPHEROIDAL GRAPHITE CAST IRON PIPE OF FERRITIC STRUCTURE AND METHOD OF PRODUCING THE SAME

BACKGROUND OF THE INVENTION

The as-cast structures of conventional spheroidal graphite cast iron pipes (particularly those produced by centrifugal casting) belong either to spheroidal graphite+pearlite+ferrite (a-type) or to spheroidal graphite +cementite+pearlite+ferrite (b-type), and as such, they are so brittle that practical strength cannot be obtained unless they are annealed.

This is because after a spheroidal graphite cast iron pipe is cast, in the case of centrifugal casting, it is allowed to cool to about 700°–500°C within the mold, (which is a cylindrical metal flask) when heat is absorbed by the mold through the sand lining formed on the inner surface of the mold, accelerating the cooling of the cast pipe to prevent the $Ar_1$ transformation, with the result that pearlite remains in the structure. Even in the case of casting such pipe by a gravity casting method using sand molds, the same may be said if it is a thin-walled pipe.

The means heretofore employed as remedies therefore include decomposing pearlite by heat treatment for ferritization; increasing the Si content to 3.0% or above; and, in the case of centrifugal casting, increasing the thickness of the sand lining material in the mold (metal flask). However, the ferritization of pearlite by heat treatment requires a large amount of heat energy such as from oil, gas or the like and it also requires labor and facilities for heat treatment. Moreover, it raises problems including the pipe being caused to deform by heat treatment as well as reduction of tensile strength. On the other hand, the means resorting to the adjustment of Si content, though achieving ferritization in the as-cast condition, has the disadvantage of the pipe being brittle due to the high Si content, while the countermeasure resorting to increasing the thickness of the sand lining material to decrease the rate of cooling, through achieving ferritization in the as-cast condition, raises problems including the productivity being greatly decreased in view of the time involved in forming molds and the rate of cooling after casting.

A mold (in the form of a cylindrical metal flask) used in centrifugal casting is internally provided with a sand lining. Since this lining is generally as thin as 2mm or thereabouts formed as by the sand resin process, the heat in the cast pipe is quickly absorbed by said mold through the lining, thereby increasing the cooling rate of the cast pipe. If, therefore, the thickness of such lining is increased to about 25 – 40mm, it is possible to decrease the cooling rate. In that case, however, it is not possible to make use of simple means such as said sand resin process, and it becomes necessary to resort to a special molding procedure which requires a special molding installation and much labor and time. For example, it would involve placing said mold (which is generally as long as 6m) upright, setting a metal core concentrically within the mold to define an annular space of predetermined thickness between said mold and said metal core and pouring molding sand into the annular space while stamping the same.

SUMMARY OF THE INVENTION

The present invention is radically distinct from these conventional spheroidal graphite cast iron pipes, methods of producing the same and means for ferritization and is intended to provide a spheroidal graphite cast iron pipe having a ferritic structure produced by simple means. The present invention is characterized in that it provides a spheroidal graphite cast iron pipe cast in a non-chilled (cementite-free) condition and cooled while controlling the rate of dissipation of the self-heat in a heat-sourceless furnace. It is also characterized in that it provides spheroidal graphite cast iron pipe having a ferritic structure produced in such a manner that a spheroidal graphite cast iron pipe cast in a non-chilled (cementite-free) condition is withdrawn from the mold, whereupon it is charged into a pit furnace or tunnel furnace using no heat source, in which the rate of cooling of the cast iron pipe is adjusted by controlling the rate of dissipation of the self-heat of the charged cast iron pipe.

On the other hand, in the case of centrifugal casting according to the present method, the sand lining for the mold may be thin in the order of the usual thickness, and it is possible to apply such lining by the conventional simple molding procedure in which while the mold is being rotated as in the centrifugal casting process, resin coated sand is supplied to the interior to centrifugally form a lining layer. Moreover, in order to achieve the intended object by decreasing the cooling rate of the cast pipe, it is only necessary to apply a simple method in which the interior of the mold is sealed with respect to the surroundings or a heat insulating material is wrapped within the inner surface of the cast pipe in the mold. Further, according to the present invention, the economic merit achieved by said difference in the molding aspect is high as compared with the case of applying a thick lining particularly when a plurality of molds are to be utilized in turn to carry out an efficient casting operation without letting the centrifugal casting equipment idle.

DETAILED DESCRIPTION OF THE INVENTION

The present invention will now be described in more detail with reference to embodiments thereof.

According to the invention, a spheroidal graphite cast iron pipe is cast in a non-chilled (cementite-free) condition and the pipe thus produced is withdrawn from the mold when the pipe is at 850° – 900°C, whereupon it is immediately charged into a tunnel furnace or pit furnace. The tunnel furnace or pit furnace has been heated to about 300° – 500°C in advance by a separate heat source or by the self-heat of other preceding cast pipes. By controlling the rate of dissipation of the self-heat of the charged cast pipe, the rate of cooling of the charged cast pipe is greatly decreased to a value adequate for the intended object, so that coupled with the fact that a substantial number of graphite atoms appear at the time of casting, the austenite is readily transformed into graphite and ferrite, whereby a spheroidal graphite cast iron pipe having a ferritic structure can be easily obtained.

In this case, if cementite crystalizes out at the time of casting, then said cementite cannot be decomposed unless it is subjected to heat treatment by holding it at 900°C for some hours. In the present invention, therefore, in casting a spheroidal graphite cast iron pipe, it is necessary to carry out casting in a non-chilled (cementite-free) condition.

DESCRIPTION OF TABLE, CHART AND PHOTOMICROGRAPHS

The following Table 1 shows specific embodiments of the prior art and the invention. In the Table, examples Nos. 1 – 6 refer to spheroidal graphite cast iron pipes in the as-cast condition according to the prior art, and example Nos. 7 – 12 refer to those treated according to the present invention. The numbers noted in the cooling curve of the chart correspond to those shown in the Table.

In Table 1(a) produced later in the specification example Nos. 1-6 show pipe strengths of the corresponding respective samples of Table 1 after annealing.

In the attached photomicrographs in lieu of drawings, FIGS. 1-6 are micrographs (magnification: × 100) of prior art samples Nos. 1-6 respectively referred to in Table 1. Similarly, FIGS. 7-12 are micrographs (magnification: × 100) of sample embodiments of the invention Nos. 7-12 respectively referred to in Table 1.

Figure 1:
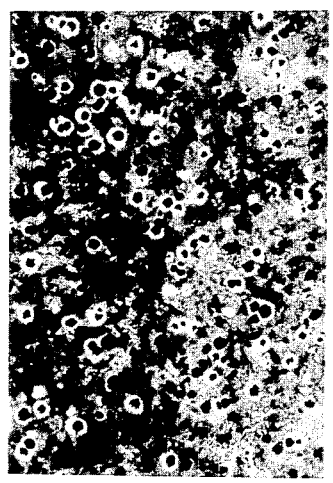
Figure 4:
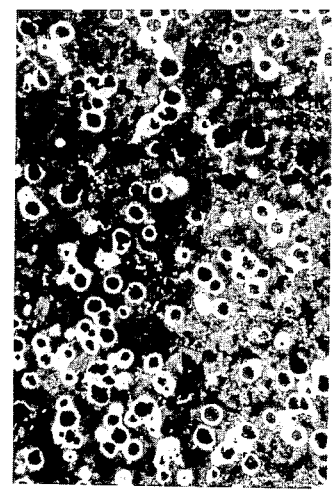
Figure 2:
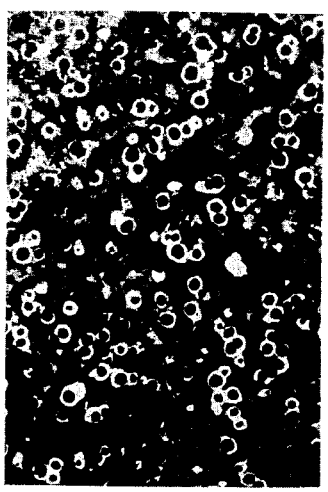
Figure 5:
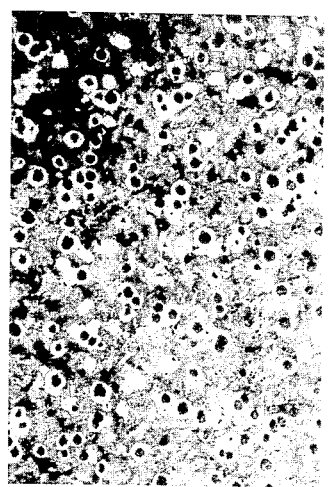
Figure 3:
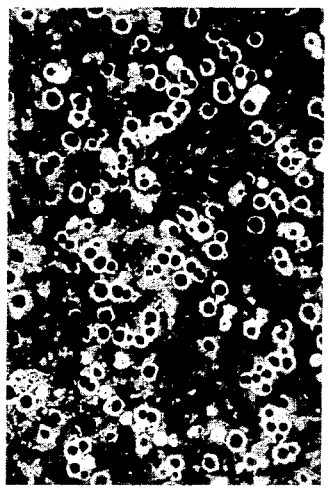
Figure 6:
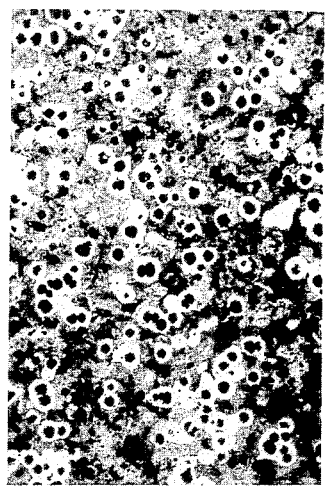
Figure 7:
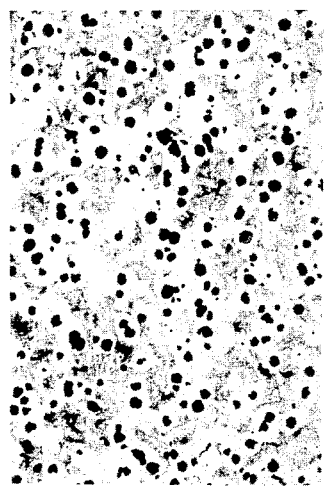
Figure 10:
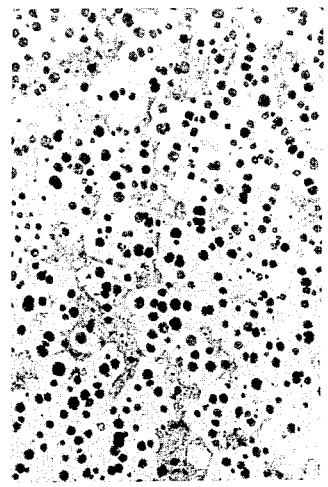
Figure 8:
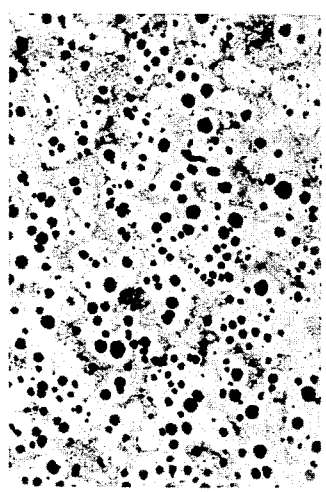
Figure 11:
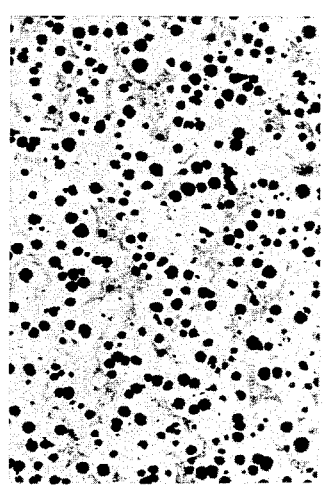
Figure 9:
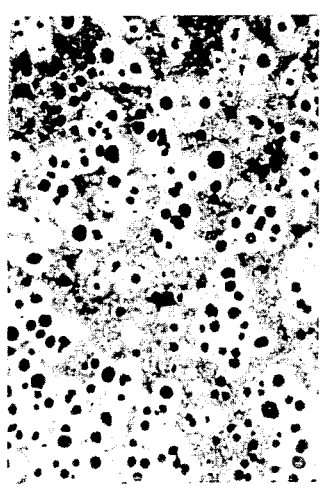
Figure 12:
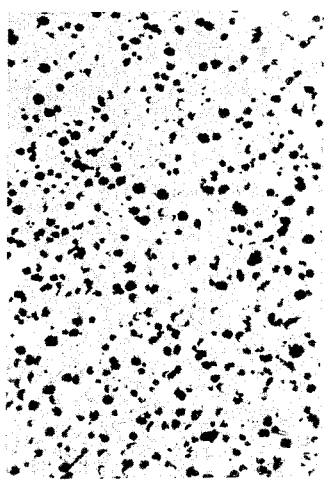
Figure 13:
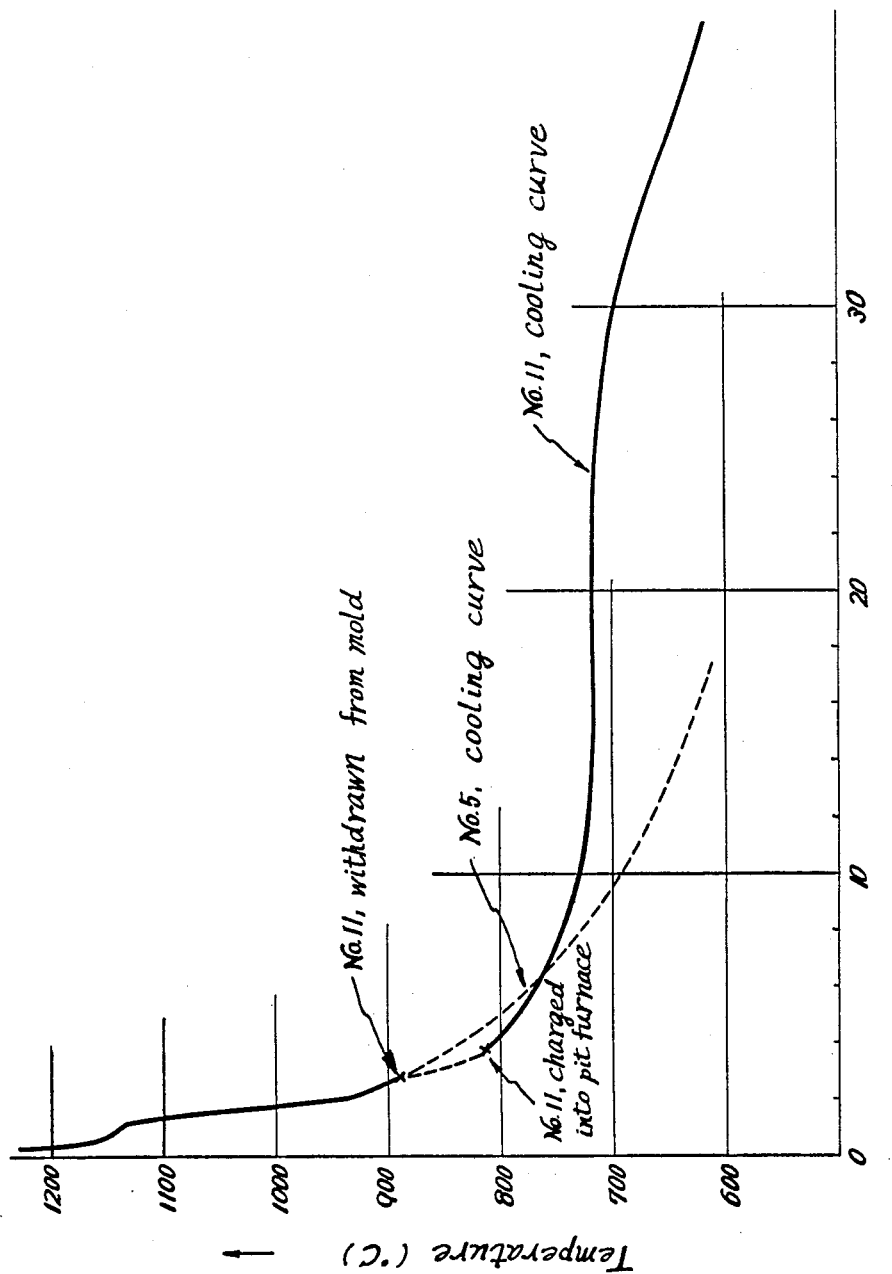

FIG. 13 is a Time-Temperature graph showing an example of a cooling curve corresponding to two of the samples referred to in Table 1.

adjusting the degree of opening of a vent provided in said furnace.

As can be seen in the embodiments the ferritization achieved by the present invention is remarkable, and spheroidal graphite cast iron pipes having very high practical strengths can be obtained. In particular, since the invention makes use of the self-heat of a cast pipe to carry out what may be called self-annealing, thereby making it unnecessary to use any separate heat source (oil or gas) for heat treatment, the invention is useful from the standpoint of saving of materials and prevention of environmental pollution.

When a product obtained by the conventional heat treating method, i.e., by annealing an as-cast pipe is compared with a product obtained by the controlled slow cooling according to the present invention, their tensile strengths differ as follows provided that the casting conditions are the same.

Thus, annealing-test specimens obtained by holding the remaining pieces of the as-cast pipes indicated at Nos. 1 – 6 shown in the table on page 6 of the specification in a furnace at 950°C for 2 hours and then slowly cooling them in said furnace at the rate of 2° – 3°C/min

TABLE 1

| | No. | EMBODIMENTS (250 mm φ × 500 mml) | | Average rate of cooling from 800–700°C (°C/min) | Microscopic structure | | Pipe strengths | | |
|---|---|---|---|---|---|---|---|---|---|
| | | Pipe wall thickness (mm) | Si content (%) | | Ferrite (%) | Cementite (%) | Tensile (Kg./mm²) | Elongation (%) | Impact strength V-notched charpy (Kg-m/cm²) |
| As-cast | 1 | 10.5 | 2.47 | 52.4 | 2 | 0 | 63.0 | 1.2 | 0.224 |
| | 2 | 10.0 | 2.70 | 55.8 | 5 | 0 | 60.5 | 1.8 | 0.256 |
| | 3 | 14.5 | 2.51 | 36.7 | 5 | 0 | 58.7 | 2.0 | 0.289 |
| | 4 | 15.0 | 2.77 | 34.1 | 10 | 0 | 57.4 | 2.6 | 0.340 |
| | 5 | 20.5 | 2.40 | 21.6 | 7 | 0 | 58.0 | 2.0 | 0.323 |
| | 6 | 21.5 | 2.81 | 23.0 | 15 | 0 | 59.7 | 2.8 | 0.373 |
| Taken out at 900°C after Casting and then pit-charged | 7 | 10.5 | 2.53 | 8.8 | 60 | 0 | 55.4 | 10.2 | 0.806 |
| | 8 | 11.0 | 2.78 | 8.4 | 80 | 0 | 55.0 | 14.0 | 1.183 |
| | 9 | 15.0 | 2.44 | 6.0 | 70 | 0 | 53.3 | 13.6 | 1.077 |
| | 10 | 15.0 | 2.75 | 5.5 | 85 | 0 | 54.9 | 15.2 | 1.375 |
| | 11 | 20.0 | 2.49 | 3.9 | 95 | 0 | 50.6 | 16.0 | 1.602 |
| | 12 | 21.0 | 2.83 | 3.8 | 100 | 0 | 54.2 | 15.4 | 1.488 |

Notes:
1. Components other than Si:
   C : 3.4 – 3.8%
   Mn : 0.3 – 0.6%
   P : 0.04 – 0.07%
   S : 0.006 – 0.012%
   Mg : 0.032 – 0.046%
2. Heat insulating material for metal mold:
   Resin coated sand, 2 – 3mm thick, applied by enameling.

DESCRIPTION OF PREFERRED EMBODIMENTS

In the embodiments of the present invention shown in the table, the Si content is 2.85% or below. High Si content will facilitate ferritization but will result in brittleness. Even for the same ferrite, lower Si content provides higher ductility. This is the reason why Si content is restricted to 2.85% or below in the present invention. As for the rate of cooling, suitably it is about 2° – 10°C/min in terms of the average rate of cooling when the temperature of a cast iron pipe lowers from 800° to 700°C, but it is necessary to adjust it depending upon the amounts of C and Si. Examples of prior art and present invention cooling rates are shown in the notes in the table, although it is to be understood that the rate of cooling is not limited to the particular values shown in the examples. Change of the rate of cooling to a desired value may be achieved by changing the method of heat-insulating a heat-sourceless furnace or were measured. It is apparent as shown in Table 1(a) that even if the elongation can be increased to a practical level, the tensile strength is low as compared with Nos. 7 – 12 according to the present invention.

TABLE 1(a)

| No. | Pipe strengths (after annealing) | |
|---|---|---|
| | Elongation (%) | Tensile (kg/mm²) |
| 1 | 10.7 | 43.6 |
| 2 | 13.5 | 49.2 |
| 3 | 13.1 | 43.0 |
| 4 | 15.6 | 47.7 |
| 5 | 15.0 | 44.3 |
| 6 | 16.1 | 48.0 |

Further, it is therefore, no longer necessary to employ an operator for annealing operation, thus radically saving labor, and there is no possibility of imparting unnecessary heat to pipes due to reheating. Therefore, there is no danger whatever of pipes being deformed due to heat. Further, since ferritization can be reliably and easily achieved without resorting to high Si content, there are advantages including the saving of Si and the securing of ductility.

As a result of the present invention, a cast iron pipe whose graphite has been perfectly spheroidized with addition of a much less amount of spheroidizing agent than in the prior art and formed of a refined molten metal refined by a method disclosed in a co-pending U.S. patent application Ser. No. 539,314 filed Jan. 8, 1975, comprising treating a molten metal at temperatures above the decomposition temperature of $SiO_2$ with a refining agent consisting of CaO, graphite powder, Ca - Si and $CaC_2$ so that part of the graphite structure may have spheroidal graphite without being subjected to spheroidizing treatment can be perfectly ferritized extremely easily by simply allowing it to cool in the as-cast condition while controlling the rate of heat dissipation. This may be satisfactorily applied particularly to thin-walled pipes. In addition, a pit furnace and a tunnel furnace have been shown by way of example as a heat dissipation rate controlling furnace for use in the present invention. However, in the case of centrifugal casting, if the mold (metal flask) is sealed after casting or a heat insulating material is wound around the inner surface to make it possible to slowly cool the cast pipe at the intended rate, then the centrifugal casting mold can be used as a substitute for such pit furnace or tunnel furnace.

What is claimed is:

1. A method of producing a spheroidal graphite cast iron pipe of ferritic structure comprising the steps of casting a spheroidal graphite cast iron pipe in a non-chilled condition, withdrawing the casting while hot from the mold and charging it into a furnace or similar chamber, in which the dissipation of the self-heat of the charged cast iron pipe is delayed to provide a controlled gradual rate of cooling of said cast iron pipe at an average cooling rate from 800° – 700°C on the order of 2°–10°C per minute, thereby providing a spheroidal graphite cast iron pipe having a ferritic structure.

2. The method of claim 1 wherein the pipe is withdrawn from the mold when the pipe is at a temperature in the order of 850° – 900°C.

3. The method of claim 2 wherein the furnace or chamber has an initial temperature upon charging the cast iron pipe in the order of 300° – 500°C.

4. The method of claim 1 wherein the Si content is in the order of 2.85% or below.

5. A spheroidal graphite cast iron pipe of ferritic structure produced by the method of claim 4.

6. A spheroidal graphite cast iron pipe of ferritic structure produced by the method of claim 1.

* * * * *